(12) United States Patent
Lowrey et al.

(10) Patent No.: US 11,565,894 B2
(45) Date of Patent: Jan. 31, 2023

(54) ROTARY DISCHARGE OF CONTAINERS FROM A DEPALLETIZER

(71) Applicant: Ska Fabricating Inc., Durango, CO (US)

(72) Inventors: Dan Lowrey, Durango, CO (US); Brian Cronin, Durango, CO (US); Nicholas Lemmer, Durango, CO (US)

(*) Notice: Subject to any disclaimer, the term of this patent is extended or adjusted under 35 U.S.C. 154(b) by 0 days.

(21) Appl. No.: 17/014,840

(22) Filed: Sep. 8, 2020

(65) Prior Publication Data
US 2021/0070559 A1    Mar. 11, 2021

Related U.S. Application Data

(60) Provisional application No. 62/897,797, filed on Sep. 9, 2019.

(51) Int. Cl.
| | |
|---|---|
| B65G 59/02 | (2006.01) |
| B65G 61/00 | (2006.01) |
| B65G 47/80 | (2006.01) |
| B65G 47/82 | (2006.01) |
| B65G 47/26 | (2006.01) |

(52) U.S. Cl.
CPC ......... B65G 59/026 (2013.01); B65G 47/261 (2013.01); B65G 47/80 (2013.01); B65G 47/82 (2013.01); B65G 61/00 (2013.01); *B65G 2201/0252* (2013.01)

(58) Field of Classification Search
CPC .... B65G 59/026; B65G 47/261; B65G 47/80; B65G 47/82; B65G 61/00; B65G 2201/0252; B65G 47/1464; B65G 47/1428; B65G 2201/0244; B65G 59/02; B65H 3/322; Y10S 414/112
See application file for complete search history.

(56) References Cited

U.S. PATENT DOCUMENTS

| | | | | |
|---|---|---|---|---|
| 2,848,096 | A * | 8/1958 | Luginbuhi | B65G 47/682 221/156 |
| 3,180,499 | A * | 4/1965 | Wildheim | B65G 59/005 414/796.8 |
| 3,187,909 | A * | 6/1965 | Jeremiah | B65G 59/005 414/796.8 |
| 3,198,361 | A * | 8/1965 | Krupp | A23L 3/001 414/416.07 |
| 3,224,554 | A * | 12/1965 | Moulder | B65G 47/684 198/392 |
| 3,543,949 | A * | 12/1970 | Weier | B65G 59/005 414/796.8 |
| 3,643,823 | A * | 2/1972 | Argyres | B65G 59/026 414/416.07 |
| 3,768,675 | A * | 10/1973 | Argyres | B65G 59/026 414/416.07 |
| 3,788,497 | A * | 1/1974 | Carlson | B65G 47/5181 414/788.8 |

(Continued)

*Primary Examiner* — Gregory W Adams
(74) *Attorney, Agent, or Firm* — Bradley Fox

(57) ABSTRACT

The invention relates to a dispenser for transferring layers of goods from a pallet onto a receiving surface and then down a discharge conveyor. The dispenser incorporates a vertically movable platform capable of bringing a first tier of goods in alignment with a rotary table. Sweeper arm moves the goods on to the table as it rotates. Goods accumulate on the rotary table and then become guided down a discharge conveyor for further processing.

10 Claims, 9 Drawing Sheets

(56) References Cited

U.S. PATENT DOCUMENTS 4,073,388 A * 2/1978 Carter .................... B65G 57/00
414/564
4,561,817 A * 12/1985 Spletzer .................. A23L 3/001
414/788.9
5,044,487 A * 9/1991 Spatafora ........... B65G 47/1457
198/443

* cited by examiner

ROTARY DISCHARGE OF CONTAINERS FROM A DEPALLETIZER

CROSS-REFERENCE TO RELATED APPLICATION

This application claims the benefit of U.S. Provisional Application No. 62/897,797 filed Sep. 9, 2019.

FIELD OF THE INVENTION

The invention relates to an apparatus and method for dispensing layers of containers, one layer at a time, from a stack of superimposed layers that have separating inserts positioned between each layer using a rotating takeoff table to accumulate, align in a single file, and discharge containers from the table for further processing.

BACKGROUND ART

Manufacturers of beverages or other products require empty containers that are typically sold in bulk pallet form. The containers are arranged on a pallet in a stack of superimposed layers that have separating inserts positioned between each layer. Containers need to be taken from the pallets and uniformly delivered in single file down a line for further processing such as washing, decorating operations (including the use of labels, shrink sleeves, or direct printing) filling, etc. An apparatus that takes containers from a bulk pallet for processing is typically called a depalletizer, and dispensing containers from a pallet is referred to as depalletizing.

At low speeds, pallets can be manually depalletized. This process typically requires several operators to individually move containers from the pallet to the packaging line. However, this is a tedious process that leads to high labor costs, low morale, errors, and poor quality of the product due to the employee's dirty hands and fingers touching the inside of the container.

At high speeds, robotic machinery can be used to feed containers onto a packaging line. These dispensers involve expensive machinery that is generally large in size and therefore not a viable solution to a large segment of manufacturers.

An affordable, reliable alternative is a fully automated apparatus that vertically moves a layer of containers to a height where they can be pushed off in quantity onto a collection area, which could be a static plate, or a conveyance. Ultimately, the containers must be moved into a single file line for downstream processing.

Examples of depalletizers are found in the prior art. For example, U.S. Pat. No. 4,032,021 discloses a depalletizer for unloading layers of goods from a pallet onto a takeoff surface. The depalletizer comprises a vertically movable platform, lift means for aligning the individual layers of containers with the takeoff surface, and a sweeper that moves with the layers of containers for transferring the successive layers of containers from the pallet to the takeoff surface when the takeoff surface is level with each respective layer. This depalletizer unloads individual layers of the pallet to the takeoff surface. Such a depalletizer fails to teach accumulating and isolating containers and aligning the containers in a single file for further processing.

Depalletizers designed to accumulate layers of containers and then isolate and align containers into a single file line for further processing exist in the prior art. The short comings of these devices are the need for additional features to keep the containers moving or additional space for conveyor systems to accumulate and isolate containers into a single file line. The former category of devices often requires a receiving surface that can tilt, vibrate, have an air knife, or other additional features to move the container forward down the line and eventually force containers into a single file. The latter category of devices feeds containers through a series of constricting conveyors until the containers align in single file, but such a configuration requires significant space and additional expense and often needs to incorporate the additional features discussed above. The prior art depalletizer design limitations increase the expense, size, and hazards related to depalletizers. What is therefore needed is an apparatus that removes containers from a bulk pallet and discharges the containers in single file for processing that is inexpensive, reliable, and compact.

SUMMARY OF THE INVENTION

The present invention uses a vertically movable platform to position a layer of containers, from a stack of superimposed layers that have separating inserts, in alignment with a rotary takeoff table that accumulates and isolates the containers for discharge in a single file line for further processing. The takeoff table has a rotating top surface and an entry portion with no guiderail to freely accept transfer of containers from the top layer of the layer stack. A portion of the circumference around the rotating top surface of the takeoff table incorporates a guiderail formed from modular discharge lanes. Typically, one lane is open to permit discharge of containers from the table down a discharge chute for further processing.

As the rotating top surface of the takeoff table turns, a layer sweep moves containers onto the table. An accumulation sensor triggers the layer sweep to push more containers from a pallet to the rotary takeoff table when the sensor detects that there is room on the rotary table for more containers. The speed as well as the number of containers that are pushed onto the table can be adjusted as necessary in order to accommodate the container size, shape, and the desired speed of the line. As the rotary table turns, containers come up against a container diverter that directs containers towards the outside of the table. Containers that are farthest outside will be directed into the discharge lane to exit through the discharge lane and down the discharge chute.

The discharge lane and discharge lanes are modular. Both can be mounted in many positions by removing a different discharge lane and mounting the lane in its place. This modularity allows containers to be discharged at a variety of angles relative to the depalletizer itself. This modularity provides many alternatives to how the packaging line is configured and laid out. There may be one or more chutes or one or more distribution apparatuses to meet a specific application. If desired, multiple modular discharge lanes may be installed simultaneously to supply containers to multiple packaging lines at the same time.

Further, the rotation direction of the rotating top surface of the takeoff table is reversible. By reversing the rotation of the top surface of the table and using a modular discharge lane that is designed for this opposite rotation, containers can be discharged in a larger variety of angles and orientations. Again, this provides alternatives to how the packaging line is configured and laid out.

The takeoff table may be coupled to the vertically movable platform to reduce the overall footprint of the device. In another embodiment, the takeoff table may be in communication with the vertically movable platform via a conveyance surface. This intermediary surface may allow for greater accumulation of containers between the pallet and the rotary takeoff table to permit changing out of an empty pallet after the last layer is swept without having to stop the rotation of the table. The takeoff table may be attached to a frame that supports the vertically moveable platform or it may have its own support base.

The embodiments of the present invention will be described with reference to the drawings FIGS. 1-6. The embodiments described below are intended as exemplary, and it will be appreciated by those skilled in the art that the present invention is not limited to any particular the arrangement described below.

BRIEF DESCRIPTION OF THE DRAWINGS

Embodiments of the present invention are illustrated by way of examples and are not limited to the accompanying drawings.

DETAILED DESCRIPTION OF INVENTION

Figure 1:
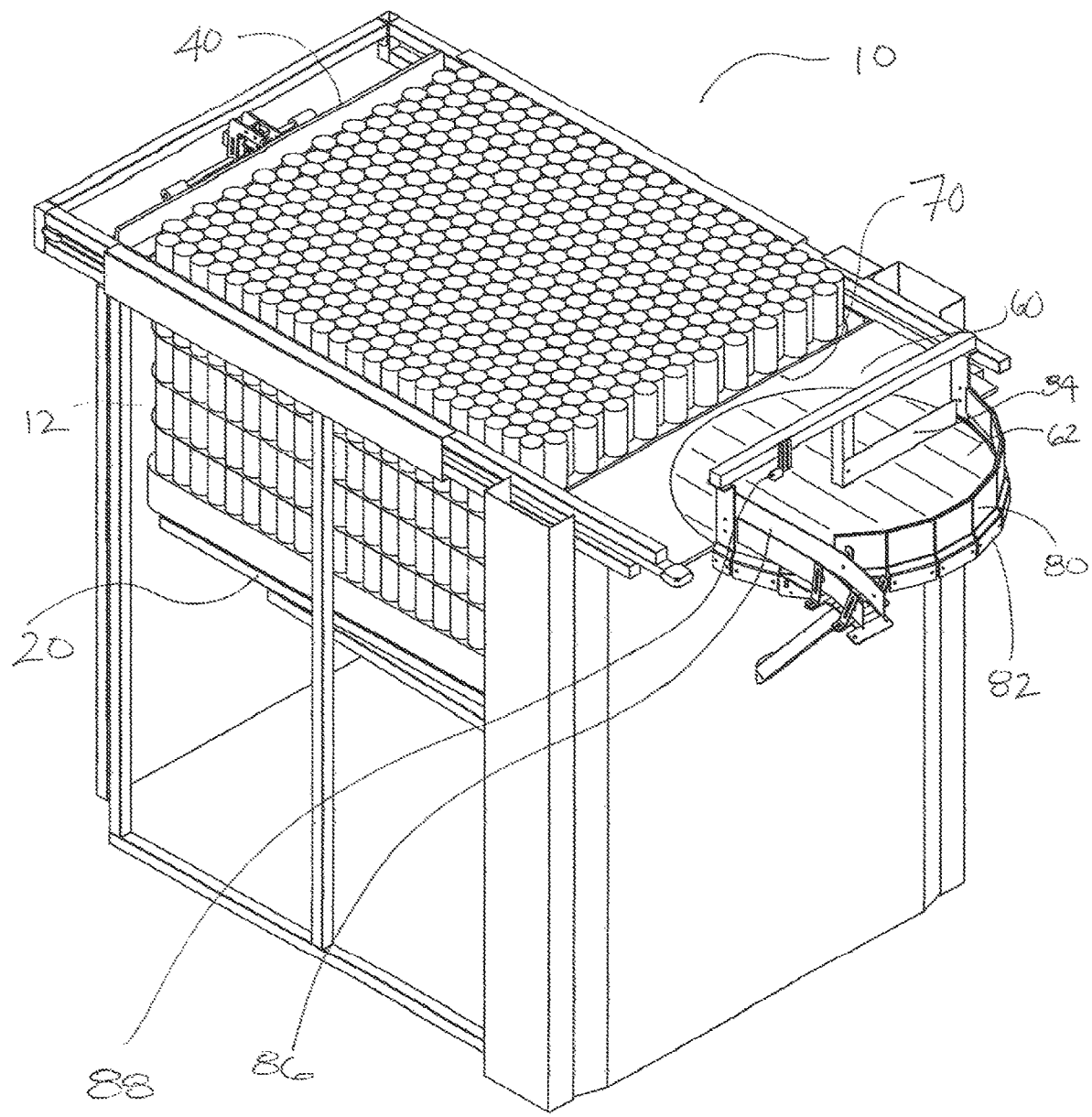
FIG. 1 shows a perspective view of an embodiment of the dispenser for unloading containers.
Figure 2:
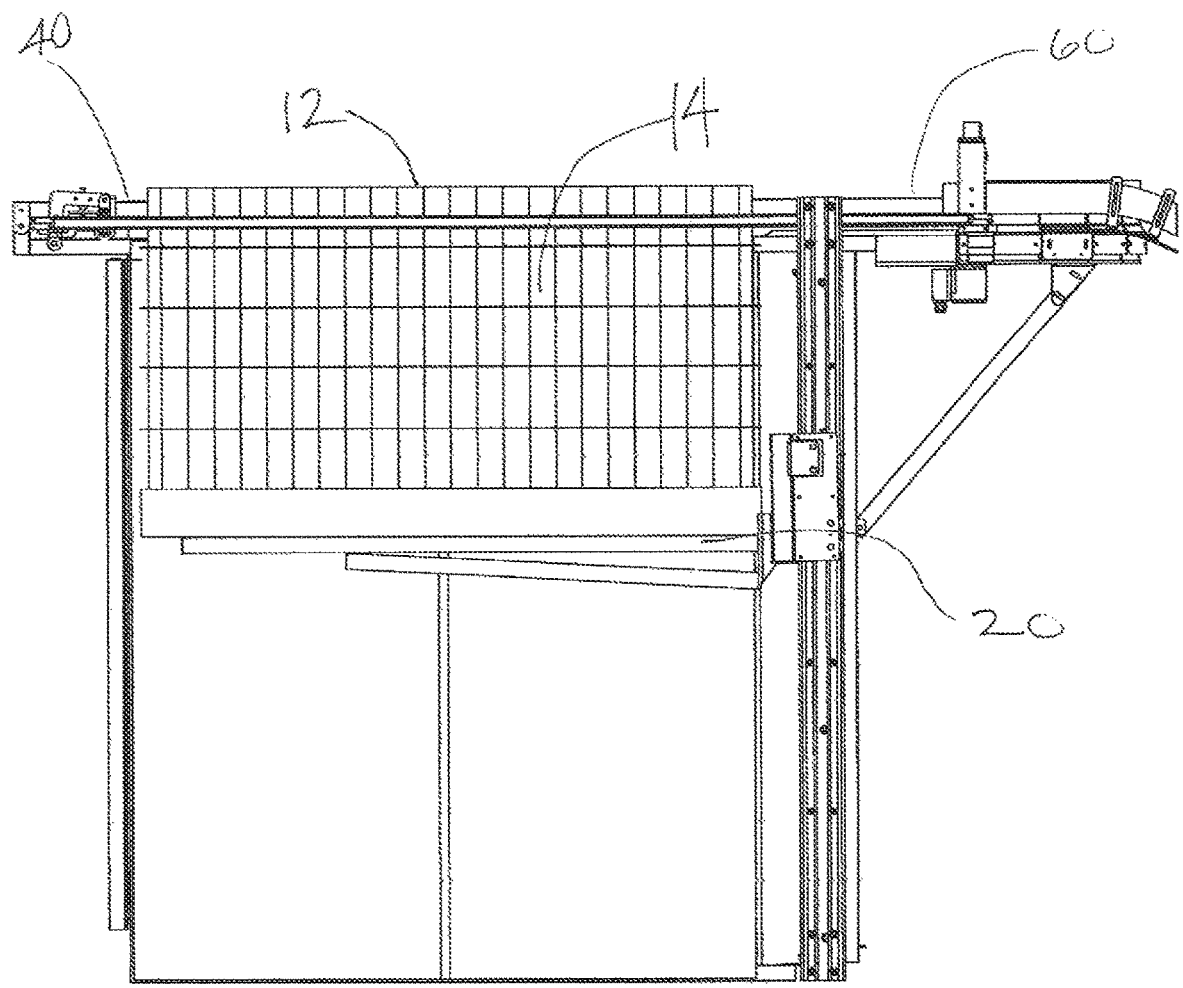
FIG. 2 shows a side view of an embodiment of the dispenser for unloading containers.
Figure 3:
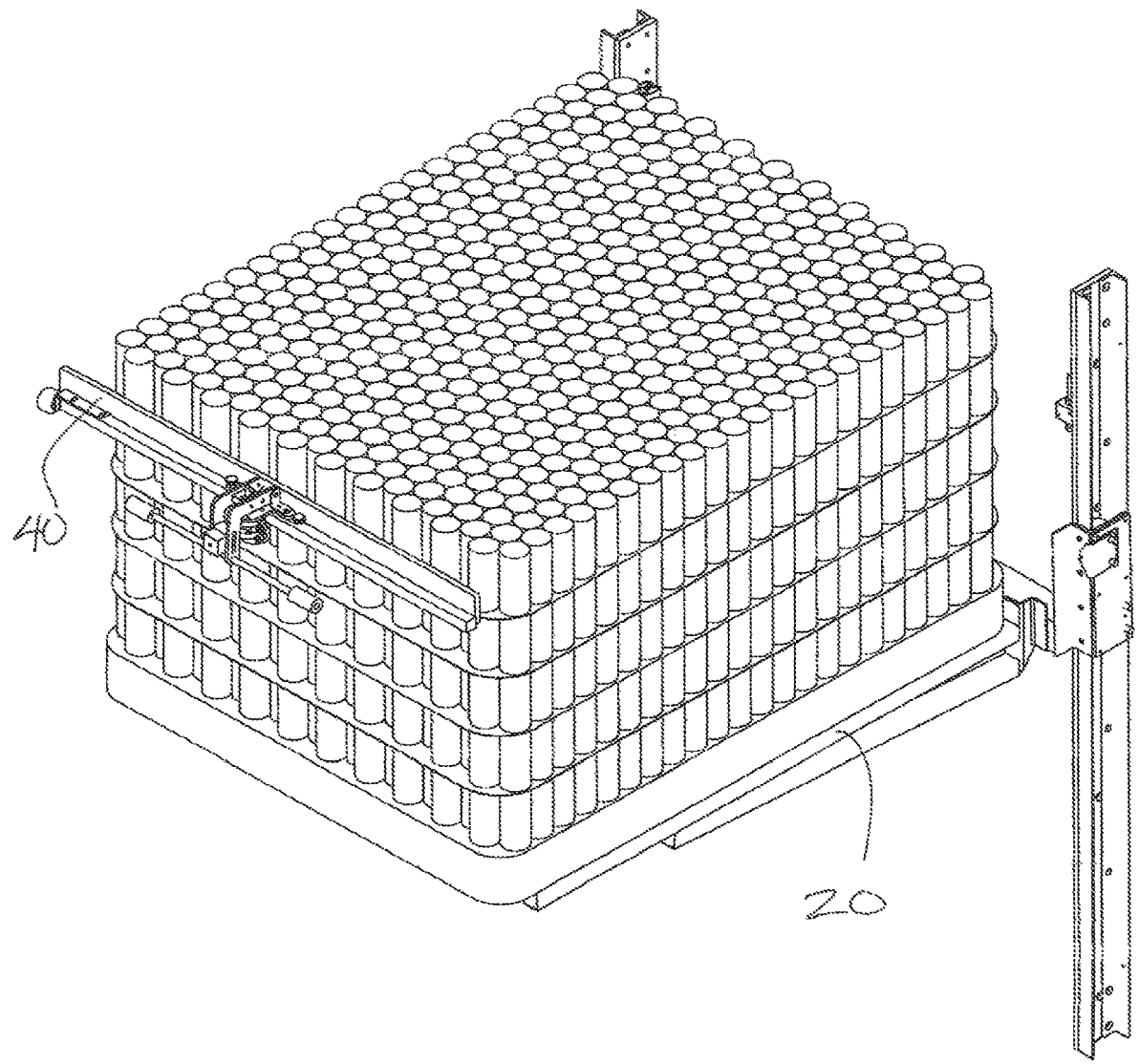
FIG. 3 shows a perspective view of an embodiment of the vertically moveable platform.
Figure 4:
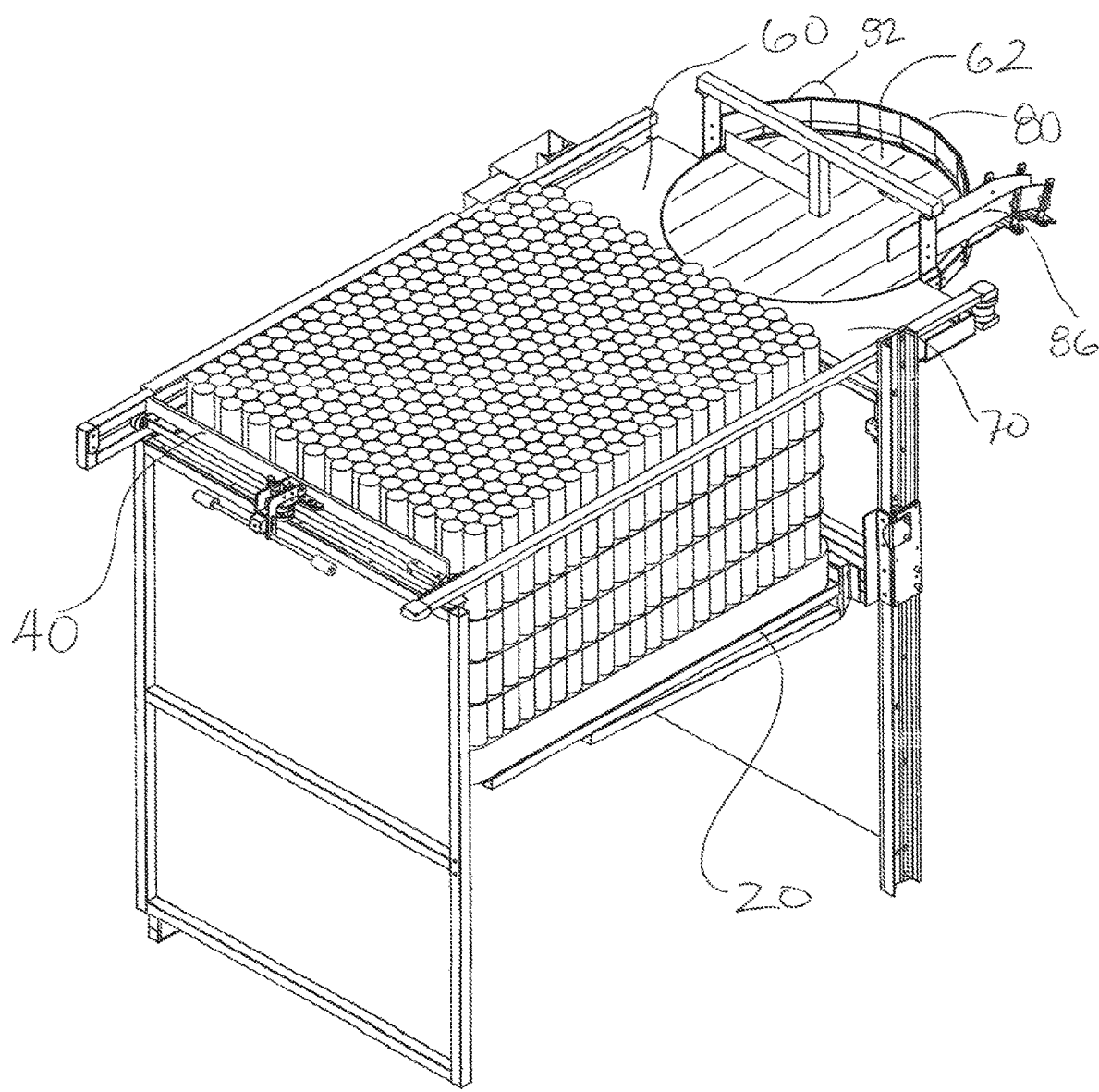
FIG. 4 shows a rear perspective view of an embodiment of the takeoff table.

Referring now to FIGS. 1-6 generally, FIG. 1 shows a first embodiment of the present invention. A dispenser for unloading containers 10 includes a vertically movable platform 20 capable of positioning a top layer of containers 12 from a pallet stack 14 of superimposed layers with separating inserts positioned between each layer to a predetermined height; a sweep 40 capable of moving the top layer of containers 12 off of the pallet stack 14; and a rotary takeoff table 60 coupled to the vertically moveable platform 20 for accumulating containers as the sweep 40 moves the containers off the pallet stack 14. The rotatory takeoff table 60 has a rotating top surface 62 and a entry portion 70 in open communication with the vertically moveable platform 20 so that the rotating top surface 62 can receive containers from the top layer of containers 12. The rotating takeoff table 60 further includes a circumferential portion 80 having a modular guiderail 82 to prevent containers from unwantedly exiting the rotating top surface 62. A container diverter 84 is located above the rotating top surface 62. The container diverter 84 guides containers towards a discharge lane 86 for discharging the outer most row of containers that are rotating around the rotating top surface 62 from the table 60 in a single file line. An accumulation sensor 88 recognizes the number of containers on the rotating top surface 62 and signals the sweep 40 to load more containers when the rotating top surface 62 is below a predetermined capacity.

In an embodiment of the invention, the vertically movable platform 20 of the dispenser 10 is a lift upon which the pallet stack 14 is placed. The vertically moveable platform 20 moves vertically to align the top layer of containers 12 at a height level with the rotary takeoff table 60. Once the platform 20 is aligned with the rotary takeoff table 60, the sweep 40 can move the top layer of containers 12 onto the takeoff table 60. The platform 20 in one embodiment moves vertically by way of an electric lift 22. The platform 20 may move vertically by way of any known device including but not limited to an electric motor or a pneumatic or hydraulic jack. Further, the vertically movable platform 20 may be surrounded by a protective cage 24 that protects an operator and the pallet stack 14 when the dispenser 10 is operating. The protective cage 24 has an opening to load the pallet stack 14 on the platform 20. The vertically movable platform may further be enclosed by a frame 26 that may act to couple the elements of the dispenser 10 to each other. The frame 26 may partially or fully enclose the platform 20.

In another embodiment of the invention, the top layer of containers 12 is moved from the pallet stack 14 on to the vertically moveable platform 20. In this embodiment, the pallet stack 14 is stationary and the vertically moveable platform 20 moves up and down to receive the top layer of containers 12 and transport the top layer of containers 12 to a height level with the rotary takeoff table 60. The vertically moveable platform 20 is then either raised or lowered to align the top layer of containers 12 at the height level with the rotary takeoff table 60. Once the platform 20 is aligned with the rotary takeoff table 60, the sweep 40 can move the top layer of containers 12 onto the rotary table 60.

In yet another embodiment of the invention, the top layer of containers 12 is moved from the vertically movable table 20 to an intermediary conveyor 30 that is in communication with the rotary takeoff table 60. This arrangement permits the accumulation of a greater number of containers on the dispenser 10 from the pallet stack 14. For example, this may permit the final layer of containers from the pallet of containers 14 to be loaded onto the conveyor 30 on then allow enough time to load a new pallet without disrupting the flow of the dispenser 10. The conveyor 30 may be of any typical design that conveys the containers from the pallet to the takeoff table 60.

The sweep 40 removes the top layer of containers 12 from the pallet stack 14 and moves them onto the rotary takeoff table 60. The sweep may be activated by a timer to load more containers onto the takeoff table 60, or it may be when activated by the accumulation sensor 88. The accumulation sensor 88 evaluates the number of containers on the rotary takeoff table 60. As the containers are discharged from the table 60, the accumulation sensor 88 recognizes a need for more containers to be transferred to the table 60, and the sweep moves towards the table 60 forcing more containers to be added to the rotating top surface 62 of the table 60 as it rotates. Once the sweep 40 reaches the end of its travel and has removed all of the top layer of containers 12 from the pallet stack 14, the sweep 40 returns to is starting position, a new layer of containers is moved in front of the sweep 20 and the process begins again with more containers being moved from the pallet stack 14 to the table 60.

In one embodiment, the sweep 40 moves solely in a horizontal motion back and forth as need to load containers. In another embodiment, the vertically movable platform 20 raises a new layer of containers prior to the sweep 40 returning to its starting position. In this instance, the sweep 40 moves vertically around the new layer of containers then returns to the starting position before proceeding to load more containers.

In another embodiment of the invention, the sweep 40 removes the top layer of containers 12 from the pallet stack 14 and moves them onto an intermediary conveyor 30 that accumulates containers before them move to the rotary takeoff table 60. In yet another embodiment, the sweep 40 removes the top layer of containers 12 from the pallet stack 14 and moves them onto the vertically movable platform 20 for transfer to the rotary takeoff table 60. One of skill in the art will understand that the purpose of the sweep 40 is to create movement of the top layer of containers from the pallet stack 14 to the rotary takeoff table 60. One of skill in the art will also recognize the sweep 40 may move in either path described above in conjunction with the alternative embodiments.

In one embodiment of the present invention, the rotary takeoff table 60 is coupled to the frame 26 enclosing vertically movable platform 20. Containers are moved directly from the pallet stack 14 to the rotary table 60 using the sweep 40. In yet another embodiment, containers are moved from the pallet stack 14 to the intermediate conveyor 30 then to the rotary table 60 using the sweep 40.

Figure 5:
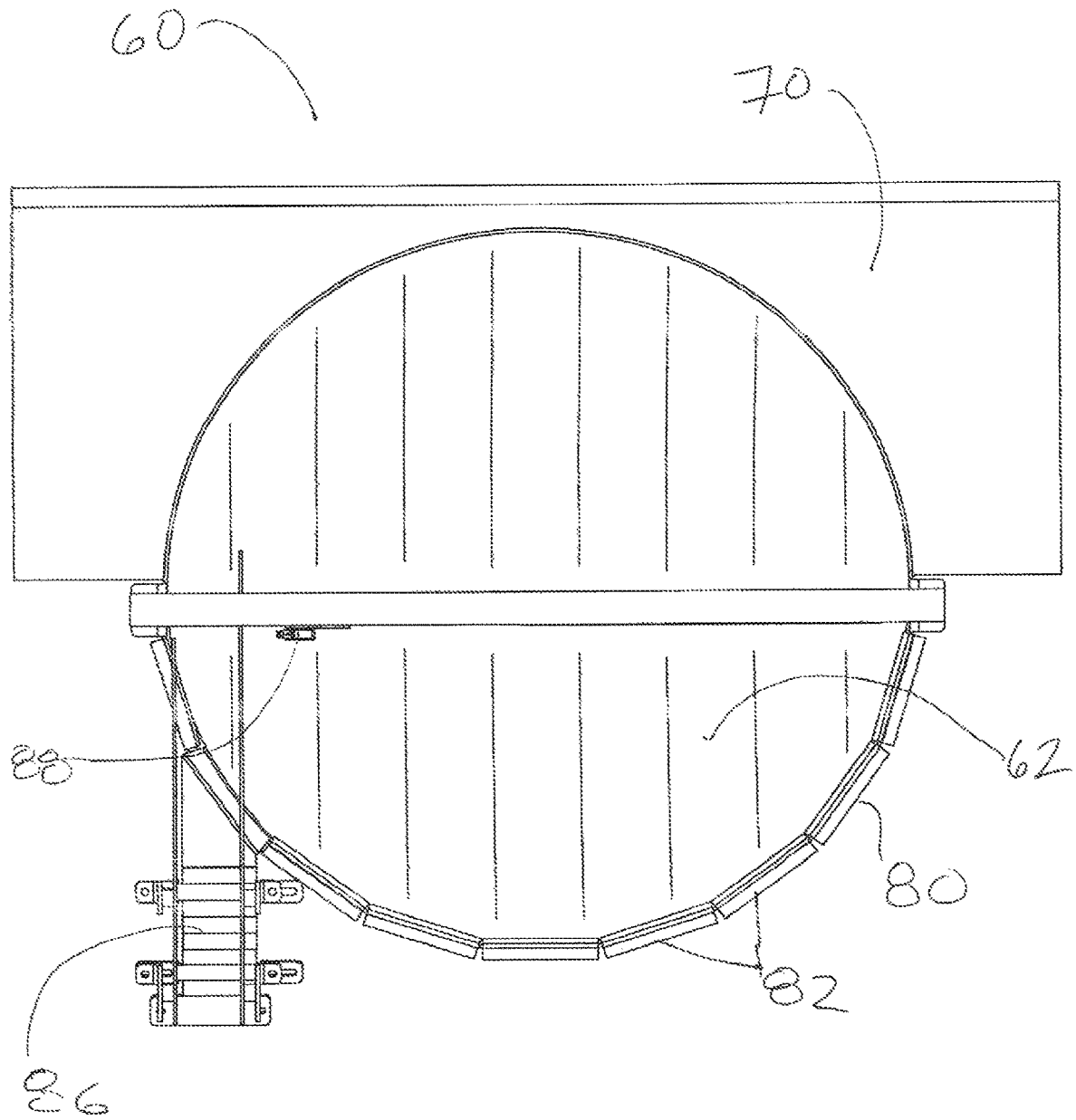
FIG. 5 shows a top view of an embodiment of the takeoff table.
Figure 6:
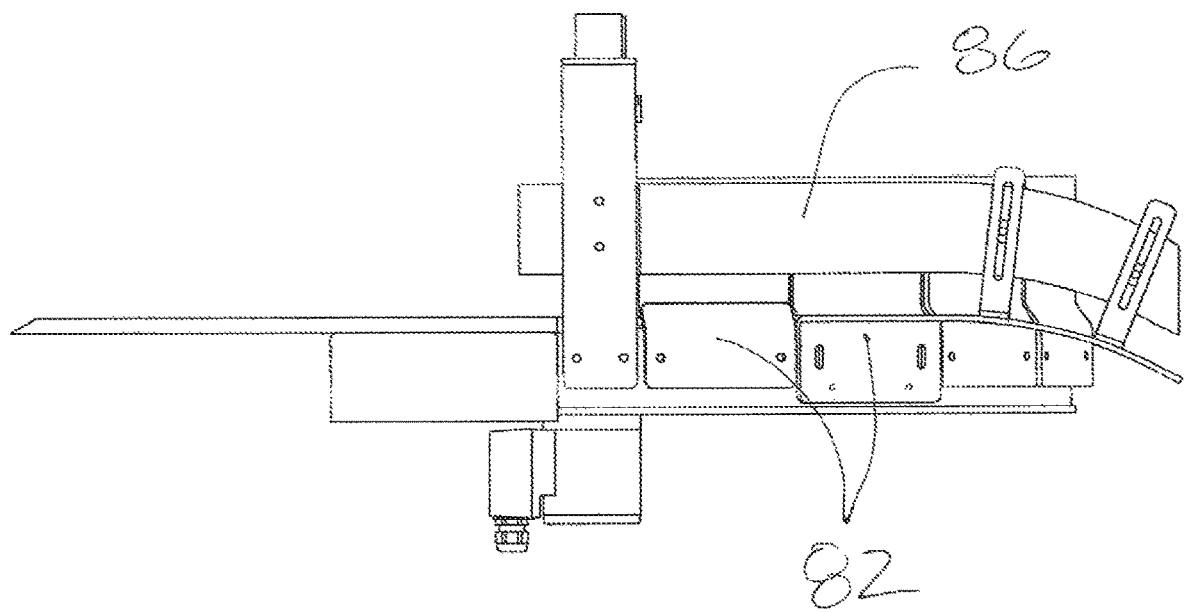
FIG. 6 shows a side view of an embodiment of the takeoff table.

Referring to FIG. 5, the rotatory takeoff table 60 includes the rotating top surface 62 and the entry portion 70 in open communication with the vertically moveable platform 20 so that the rotating top surface 62 can receive containers from the top layer of containers 12 as the sweep 40 moves. The rotating takeoff table 60 further includes the circumferential portion 80 having the guiderail portion 82 to prevent containers from unwantedly exiting rotating top surface 62 of the table 60 and at least one opening for the discharge lane 86. Above the rotating top surface 62 is the accumulation sensor 88 that recognizes the accumulation of containers on the rotating top surface 62. The accumulation sensor 88 may be located on the side or below the rotary top surface 62. The accumulation sensor 88 may be any sensor that recognizes the quantity of containers on the table 60 including for example a sensor that weighs the rotating top surface 62 to recognize the quantity of containers on the table 60. Also, above the rotatory top surface 62 is the container diverter 84 that guides containers towards the discharge lane 86 for discharging the outer most row of containers that are rotating around the table 60 off the table 60 in a single file line. In a particular embodiment, the table 60 may have more than one discharge lane 86.

As the rotating top surface 62 rotates it receives containers as they are pushed onto the table 60 using the sweep 40. As the accumulation sensor 88 recognizes the space for more containers, the sweep 40 moves containers onto the rotating table 60. As the rotating top surface 62 rotates, containers are forced against container diverter 84 that guides containers towards a discharge lane 86 for discharging the outer most row of containers that are rotating around the rotating top surface 62 from the table 60 in a single file line. An accumulation sensor 88 monitors the number of containers on the rotating top surface 62 and signals the sweep 40 to load more containers when the rotating top surface 62 is below a predetermined capacity.

Figure 7:
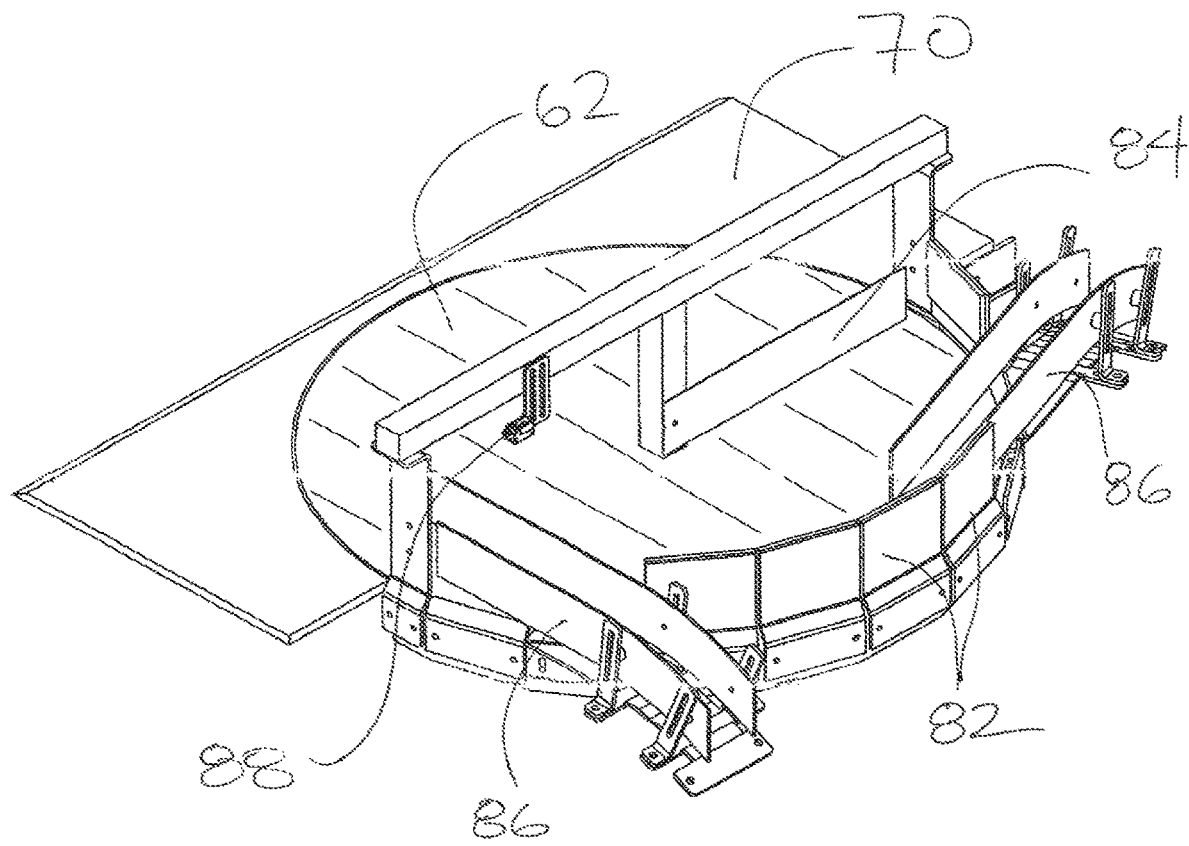
FIG. 7 shows a perspective view of an embodiment of the takeoff table with two portions of the modular guiderail removed and two discharge lanes.

Referring to FIG. 7, the circumferential portion 80 is comprised of modular guiderail portions 82 that line the circumferential portion 80 except for one or more locations left open for the discharge lane(s) 86. The guiderail portions 82 are typically the width of the discharge lane 86 such that removing a guiderail portion 82 may permit the discharge lane 86 to be located in different locations around circumferential portion 80 of the table 60. The circumferential portion 80 may have more than one guiderail portion 82 removed to permit more than one discharge lane 86. The circumferential portion 80 may have one guiderail portion 82 that encloses the entirety of the circumferential portion 80 except for the area of the discharge lane 86.

The discharge lane 86 is a structure that captures containers as they move along the outside of the rotating table 60 and the guiderail 82. The discharge lane 86 in one embodiment is a rigid thin metallic member under which the rotating top surface 62 rotates. The discharge lane 86 can be formed in any manner that directs containers as they move along the outside of rotating top surface 62 and the guiderail 82 off the table in a single file line for further processing.

The container diverter 84 directs containers that are rotating around rotating top surface 62 to the outside of the rotating top surface 62 as the table rotates. In one embodiment, the container diverter 84 is a flexible member that yields as containers rotate against it. The rotation of rotating top surface 62 forces cans to engage the container diverter 84 that then flexes and forces containers to the outside of the rotating top surface 62. As the containers rotate around the outside of the rotating top surface, they are directed in the discharge lane 86 to exit the table 60 for further processing. The container diverter 84 may be made of metal, plastic, etc. that provides sufficient resiliency to force containers to the outside of the top surface without creating a significant obstruction of containers moving around the rotating top surface 62. One of skill in the art would recognize other methods of creating a diverter 84 that does not result in significant obstruction of containers moving around the rotating top surface 62 such as a horizontal coil spring or a louver arrangement.

The discharge lane 86 accepts the outside containers rotating on the rotating top surface 62 of the table 60 and exits containers from the table 60 for further processing. The discharge lane 86 typically accepts the containers in a single file line, but it may accept containers in a wider formation and bottleneck them down and force them through the lane in single file. The surfaces of the guiderails 82, the diverter 84, and the discharge lane 86 may be lined with a surface such as PTFE or another low friction surface that resists containers jamming or getting stuck.

The table 60 may be coupled to the frame 26 as describe above. The table 60 may also be mounted upon is own base 66 that positions the rotating top surface of the table 62 to a desired height. The base 66 may be adjustable to raise or lower the rotating top surface of the table 62 as desired.

Figure 8:
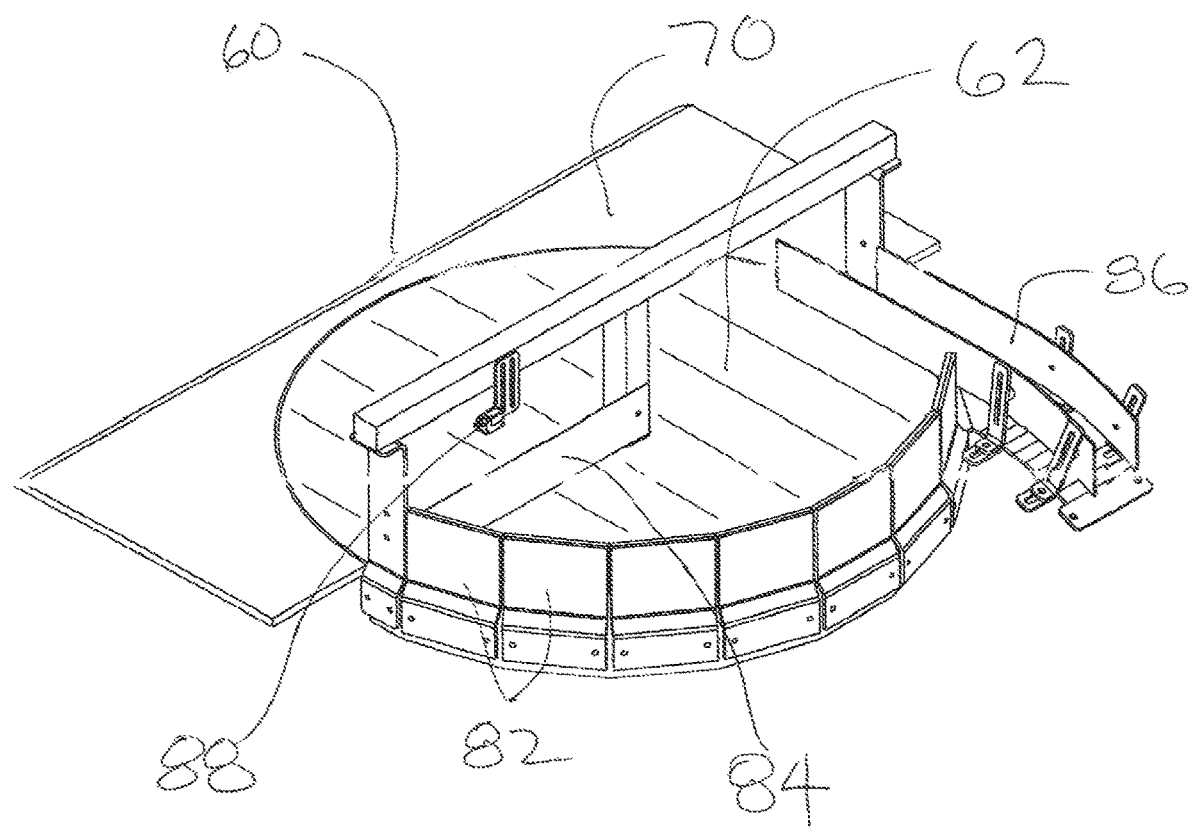
FIG. 8 shows a perspective view of the takeoff table where containers enter the discharge lane at approximately a 3 o'clock position when the table rotates clockwise.
Figure 9:
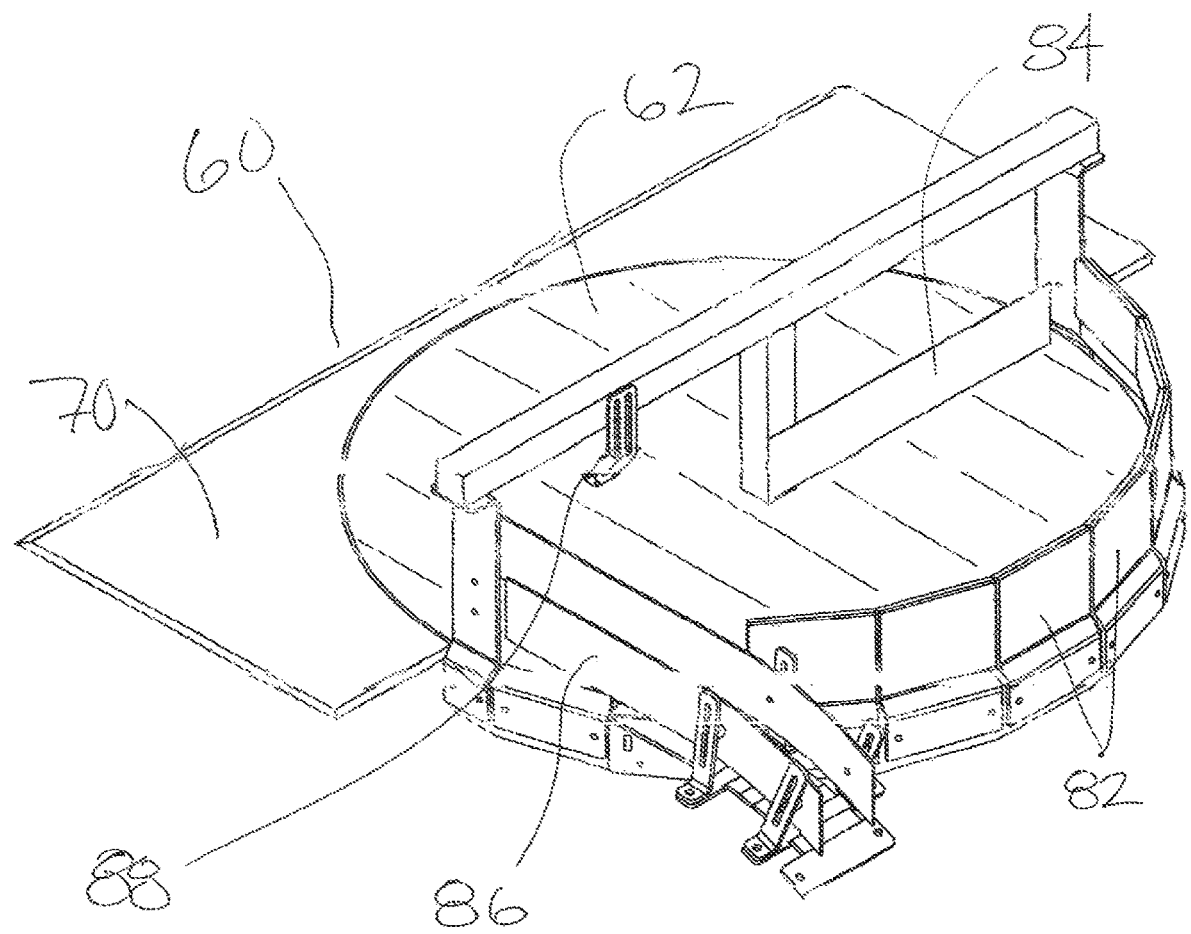
FIG. 9 shows a perspective view of the takeoff table where containers enter the discharge lane at approximately a 9 o'clock position when the table rotates counterclockwise.

Referring to FIGS. 8 and 9, the rotating top surface 62 may rotate in either direction to permit greater versatility in angles for containers to exit through the discharge lane 86. In one embodiment, the rotating top surface 62 rotates clockwise and containers enter the discharge lane 86 at approximately a 3 o'clock position when the dispenser 10 is viewed from the pallet stack 14. In one embodiment, the rotating top surface 62 rotates counterclockwise, and containers enter the discharge lane 86 at approximately a 9 o'clock position when the dispenser 10 viewed from the pallet stack 14.

Although embodiments of the present invention have been shown in the drawings, it will be understood that the invention is not limited to the embodiments disclosed, but is capable of numerous rearrangements, modifications and substitutions without departing from the spirit of the invention as set forth and defined by the claims.

What is claimed is:

1. A dispenser for unloading containers comprising:
a vertically movable platform for positioning a top layer of containers from a pallet stack of superimposed layers with separating inserts positioned between each layer to a predetermined height;
a sweep capable of moving the top layer of containers off of the pallet stack; and
a takeoff table coupled to the vertically movable platform for accumulating containers and discharging containers from the takeoff table in a single file line, the takeoff table having a rotating top surface, an entry portion in open communication with the vertically moveable platform so that the rotating top surface can accumulate containers from the top layer of containers as the sweep moves the top layer of containers off of the pallet stack, a guiderail portion to prevent containers from unwantedly exiting the rotating top surface, a container diverter that guides containers towards the outside of the rotating top surface, and a discharge lane that is approximately a single container wide, wherein an outside edge of the discharge lane is positioned substantially tangential to the outside edge of the rotating top surface and an inside edge of the discharge lane is positioned above the rotating top surface so that as the rotating top surface turns and the container diverter guides containers towards the outside of the rotating top surface, the discharge lane captures containers as they move along the outside of the rotating table for exit in a single file line off the table.

2. The dispenser of claim 1, wherein the rotary top surface may rotate in either the clockwise direction or counterclockwise direction.

3. The dispenser of claim 2, wherein the guiderail portion of the takeoff table is modular and may allow for the discharge lane to be located in different positions around the takeoff table.

4. The dispenser of claim 1, wherein the takeoff table includes an accumulation sensor that monitors the quantity of containers on the rotating top surface and transmits the information to the sweep so that the sweep can push additional containers onto the takeoff table.

5. A method for dispensing containers comprising:
placing a pallet of containers stacked in superimposed layers with separating inserts positioned between each layer on a vertically movable platform;
positioning the vertically movable platform to a predetermined height;
sweeping a portion of a top layer of containers off of the pallet onto a rotating top surface of a takeoff table having a guiderail portion that prevents containers from falling off the table as the top surface rotates and a discharge portion for dispensing containers from the table; and
diverting containers that are rotating on the top surface to the outside of the rotating top surface and through a discharge lane that is approximately a single container wide and positioned with an outside edge of the discharge lane substantially tangential to the outside edge of the rotating top surface and an inside edge of the discharge lane is positioned above the rotating top surface so that the discharge lane captures the containers for exit in a single file line through the discharge portion of the takeoff table.

6. The method for dispensing layers of stacked containers of claim 5 wherein the top surface may rotate in either the clockwise or counterclockwise direction and the guiderail portion is modular and may permit the discharge lane to be positioned in various locations around the rotating top surface.

7. The method of claim 5, wherein more containers are swept onto the rotating top surface when an accumulation sensor that monitors the quantity of containers on the rotating top surface and transmits the information to the sweep so that the sweep can push additional containers onto the table when the accumulation sensor determines that the table is below capacity.

8. A dispenser for unloading containers comprising:
a vertically movable platform for positioning a top layer of containers from a pallet stack of superimposed layers with separating inserts positioned between each layer to a predetermined height;
a sweep capable of moving the top layer of containers off of the pallet stack; and
a takeoff table attached to the vertically movable platform for accumulating containers and discharging containers from the takeoff table in a single file line, the takeoff table having a rotating top surface, an entry portion in open communication with the vertically moveable platform so that the rotating top surface can accumulate containers from the top layer of containers as the sweep moves the top layer of containers off of the pallet stack, an accumulation sensor that monitors the quantity of containers on the rotating top surface and transmits the information to the sweep so that the sweep can push additional containers onto the table, a guiderail portion to prevent containers from unwantedly exiting the rotating top surface, a container diverter that guides containers towards the outside of the rotating top surface, and a discharge lane that is approximately a single container wide, wherein an outside edge of the discharge lane is positioned substantially tangential to the rotating top surface so that as the rotating top surface turns and the container diverter guides containers towards the outside of the rotating top surface, the containers enter the discharge lane and exit in a single file line off the table.

9. The dispenser of claim 8 wherein the rotary takeoff table may rotate in either the clockwise direction or counterclockwise direction.

10. The dispenser of claim 9 wherein the guiderail portion is modular and may be arranged to divert containers through the discharge lane at different angles.

* * * * *